US011956573B2

(12) United States Patent
Ishida et al.

(10) Patent No.: US 11,956,573 B2
(45) Date of Patent: *Apr. 9, 2024

(54) IMAGE PROCESSING DEVICE, PROJECTION SYSTEM, IMAGE PROCESSING METHOD, AND IMAGE PROCESSING PROGRAM

(71) Applicant: FUJIFILM Corporation, Tokyo (JP)

(72) Inventors: Kazuki Ishida, Saitama (JP); Akihiro Ishizuka, Saitama (JP); Tomonori Masuda, Saitama (JP); Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,704

(22) Filed: May 19, 2023

(65) Prior Publication Data

US 2023/0300305 A1    Sep. 21, 2023

Related U.S. Application Data

(63) Continuation of application No. 17/484,014, filed on Sep. 24, 2021, now Pat. No. 11,695,906, which is a
(Continued)

(30) Foreign Application Priority Data

Mar. 27, 2019 (JP) .................................. 2019-061683

(51) Int. Cl.
*H04N 9/31* (2006.01)
*G09G 5/10* (2006.01)

(52) U.S. Cl.
CPC ............ *H04N 9/3182* (2013.01); *G09G 5/10* (2013.01); *H04N 9/3147* (2013.01); *G09G 2320/0646* (2013.01); *G09G 2320/0686* (2013.01)

(58) Field of Classification Search
CPC ...... H04N 9/3182; H04N 9/3147; G09G 5/10; G09G 2320/0686; G09G 2320/0646
See application file for complete search history.

(56) References Cited

U.S. PATENT DOCUMENTS 6,480,175 B1    11/2002  Schneider
7,114,813 B2    10/2006  Wada et al.
(Continued)

FOREIGN PATENT DOCUMENTS

CN    104539922 A    4/2015
JP    2002-277958 A    9/2002
(Continued)

OTHER PUBLICATIONS

International Preliminary Report on Patentability (Forms PCT/IPEA/409 and PCT/IB/338) for International Application No. PCT/JP2020/004666, dated Sep. 30, 2021, with English translation.
(Continued)

*Primary Examiner* — Brian P Yenke
(74) *Attorney, Agent, or Firm* — Birch, Stewart, Kolasch & Birch, LLP

(57) ABSTRACT

An image processing device for a projection system includes an image generation unit and a brightness acquisition unit, and the image generation unit generates data for projecting the specific image, as a first portion in the first data for display, which corresponds to the first superimposed region, generates a second portion in the first data for display, which corresponds to the first non-superimposed region based on first input image data in the data of the projection target image, which corresponds to the first non-superimposed region, and the second brightness, and generates a third portion in the second data for display, which corresponds to the second superimposed region based on second input image data in the data of the projection target image, which
(Continued)

corresponds to the second superimposed region, and the first brightness.

10 Claims, 12 Drawing Sheets

Related U.S. Application Data continuation of application No. PCT/JP2020/004666, filed on Feb. 6, 2020.

(56) References Cited

U.S. PATENT DOCUMENTS

| | | | |
|---|---|---|---|
| 8,102,332 B2 | 1/2012 | Nelson et al. | |
| 8,267,523 B2 | 9/2012 | Kondo et al. | |
| 8,994,757 B2 | 3/2015 | Surati et al. | |
| 9,124,817 B2 | 9/2015 | Ishii | |
| 9,195,126 B2 | 11/2015 | Yoshimura | |
| 9,330,479 B2 | 5/2016 | Suzuki | |
| 9,436,074 B2 | 9/2016 | Vermeirsch | |
| 9,497,432 B2 | 11/2016 | Okamoto | |
| 9,547,228 B2 | 1/2017 | Kim et al. | |
| 9,554,105 B2 | 1/2017 | Mori | |
| 9,558,541 B2 | 1/2017 | Kim et al. | |
| 9,628,767 B2 | 4/2017 | Cho et al. | |
| 9,653,010 B2 | 5/2017 | Ouchi | |
| 9,661,257 B2 | 5/2017 | Ishikawa et al. | |
| 9,754,540 B2 | 9/2017 | Takesue et al. | |
| 9,781,395 B2 | 10/2017 | Ishikawa et al. | |
| 9,883,163 B2 | 1/2018 | Naganuma | |
| 9,906,761 B2 | 2/2018 | Mori | |
| 9,930,307 B1 | 3/2018 | Kursula et al. | |
| 9,983,841 B2 | 5/2018 | Ouchi | |
| 10,101,957 B2 | 10/2018 | Yamamoto et al. | |
| 10,148,924 B2 | 12/2018 | Wada et al. | |
| 10,170,077 B2 | 1/2019 | Okamoto et al. | |
| 10,205,920 B2 | 2/2019 | Shimizu et al. | |
| 10,250,855 B2 | 4/2019 | Tanaka et al. | |
| 10,298,893 B2 | 5/2019 | Moule et al. | |
| 10,397,533 B2 | 8/2019 | Mizushiro | |
| 10,616,541 B2 | 4/2020 | Oike | |
| 10,681,319 B2 | 6/2020 | Oike et al. | |
| 11,082,672 B2 | 8/2021 | Cian et al. | |
| 11,202,044 B2 | 12/2021 | Katsuki et al. | |
| 11,258,996 B2 | 2/2022 | Kashiwagi et al. | |
| 11,343,478 B2 | 5/2022 | Kashiwagi et al. | |
| 11,386,535 B2 | 7/2022 | Cian et al. | |
| 11,477,422 B2 | 10/2022 | Masuda et al. | |
| 11,489,726 B2 | 11/2022 | Ichieda et al. | |
| 11,496,718 B2 | 11/2022 | Tseng | |
| 11,640,774 B2 * | 5/2023 | Kashiwagi | G06F 3/1446 |
| | | | 345/690 |
| 11,800,071 B2 * | 10/2023 | Inoue | G06F 3/042 |
| 2002/0041364 A1 | 4/2002 | Ioka | |
| 2002/0057361 A1 | 5/2002 | Mayer, III et al. | |
| 2008/0246781 A1 | 10/2008 | Surati et al. | |
| 2008/0259223 A1 | 10/2008 | Read et al. | |
| 2011/0234921 A1 | 9/2011 | Ivashin | |
| 2012/0281031 A1 | 11/2012 | Clodfelter | |
| 2012/0320042 A1 | 12/2012 | Green et al. | |
| 2013/0229396 A1 | 9/2013 | Huebner | |
| 2015/0009390 A1 | 1/2015 | Cho et al. | |
| 2015/0029465 A1 | 1/2015 | Ishikawa et al. | |
| 2015/0138222 A1 | 5/2015 | Imaizumi et al. | |
| 2015/0213584 A1 | 7/2015 | Ishikawa et al. | |
| 2015/0235628 A1 | 8/2015 | Sakai et al. | |
| 2015/0237317 A1 | 8/2015 | Ehara | |
| 2017/0070711 A1 | 3/2017 | Grundhofer et al. | |
| 2017/0142384 A1 | 5/2017 | Yoshimura | |
| 2017/0214895 A1 | 7/2017 | Fujioka | |
| 2017/0163948 A1 | 8/2017 | Morisawa | |
| 2021/0409664 A1 | 12/2021 | Masuda et al. | |
| 2022/0217313 A1 | 7/2022 | Ishida et al. | |
| 2023/0127139 A1 * | 4/2023 | Inoue | H04N 9/3147 |
| | | | 348/745 |

FOREIGN PATENT DOCUMENTS

| | | |
|---|---|---|
| JP | 2005-286772 A | 10/2005 |
| JP | 2007-129748 A | 5/2007 |
| JP | 2010-85563 A | 4/2010 |
| JP | 2012-189737 A | 9/2012 |
| JP | 2014-137386 A | 7/2014 |
| JP | 2014-194464 A | 10/2014 |
| JP | 2016-99478 A | 5/2016 |
| JP | 2017-102348 A | 6/2017 |

OTHER PUBLICATIONS

International Search Report (Form PCT/ISA/210) for International Application No. PCT/JP2020/004666, dated Apr. 21, 2020, with English translation.

Notice of Allowance dated Feb. 21, 2023 in corresponding U.S. Appl. No. 17/484,014.

Japanese Notice of Reasons for Refusal for corresponding Japanese Application No. 2022-166074, dated Nov. 29, 2023, with an English translation.

* cited by examiner

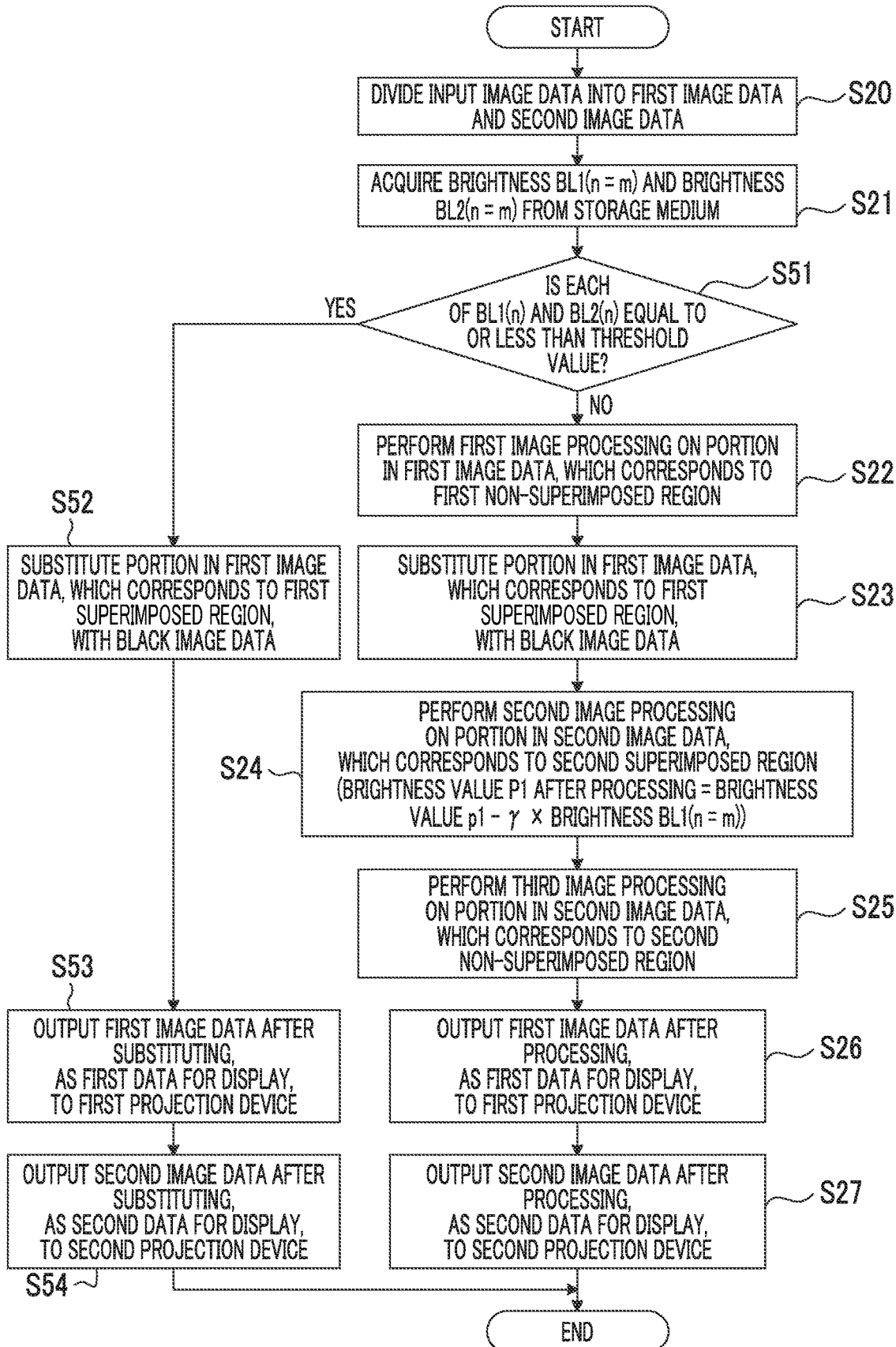

IMAGE PROCESSING DEVICE, PROJECTION SYSTEM, IMAGE PROCESSING METHOD, AND IMAGE PROCESSING PROGRAM

CROSS REFERENCE TO RELATED APPLICATION

This application is a Continuation of U.S. application Ser. No. 17/484,014 filed on Sep. 24, 2021, which is a Continuation of International Application No. PCT/JP2020/004666 filed on Feb. 6, 2020, and claims priority under 35 U.S.C. § 119(a) to Japanese Patent Application No. 2019-061683 filed on Mar. 27, 2019, the entire disclosure of which is incorporated herein by reference in its entirety.

BACKGROUND OF THE INVENTION

1. Field of the Invention

The present invention relates to an image processing device, a projection system, an image processing method, and a computer readable medium storing an image processing program.

2. Description of the Related Art

A method is known in which one image is divided to generate a plurality of division images, and a plurality of projectors projects the division images, respectively, to display one image on a large screen (for example, see JP2005-286772A and JP2014-194464A).

SUMMARY OF THE INVENTION

In a case in which the plurality of division images are projected and displayed on the large screen, the adjacent division images partially overlap each other. For example, in a case in which a predetermined image is displayed on the large screen, it is conceivable that a specific image (for example, a black image or a gray image) having sufficiently low brightness is displayed in a superimposed region of one division image and the other division image, and the predetermined image is displayed as it is in the other division image.

However, in a projector of a type that controls gradation of a projection image by controlling a transmission amount of light from a light source, even in a state in which the specific image is displayed, a minute amount of light from the light source is incident on a projection surface, and the projected specific image itself has slight brightness. Therefore, in a composite projection image obtained by overlapping two division images, the gradation of an overlapping region and the gradation of other regions are deviated, and a quality of the composite projection image deteriorates depending on a content of the image. In JP2005-286772A and JP2014-194464A, it is not assumed that the composite projection image is displayed with the overlapping region in one of the two division images as the specific image.

The present invention has been made in view of the above circumstances, and is to provide an image processing device for a projection system, a projection system, an image processing method, and a computer-readable medium storing an image processing program which can improve an image quality by aligning gradation of a projection image in a case in which a part of a plurality of images is overlapped and projected.

An image processing device according to an aspect of the present invention is an image processing device for a projection system that displays a projection target image by projecting a first image in a first projection range from a first projection unit and projecting a second image in a second projection range that overlaps a part of the first projection range from a second projection unit, in which a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, the image processing device comprises an image generation unit that generates first data for display of the first image and second data for display of the second image from data of the projection target image, and a brightness acquisition unit that acquires first brightness which is brightness of the overlapping portion in a state in which a specific image is projected on the overlapping portion only from the first projection unit and second brightness which is brightness of the overlapping portion in a state in which the specific image is projected on the overlapping portion only from the second projection unit, and the image generation unit generates data for projecting the specific image, as a first portion in the first data for display, which corresponds to the first superimposed region, generates a second portion in the first data for display, which corresponds to the first non-superimposed region, based on first input image data in the data of the projection target image, which corresponds to the first non-superimposed region, and the second brightness, and generates a third portion in the second data for display, which corresponds to the second superimposed region, based on second input image data in the data of the projection target image, which corresponds to the second superimposed region, and the first brightness.

A projection system according to another aspect of the present invention comprises the image processing device, the first projection unit, and the second projection unit.

An image processing method according to still another aspect of the present invention is an image processing method in which, for displaying a projection target image by projecting a first image in a first projection range from a first projection unit and projecting a second image in a second projection range that overlaps a part of the first projection range from a second projection unit, first data for display of the first image and second data for display of the second image are generated from data of the projection target image, in which a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, and the image processing method comprises a brightness acquisition step of acquiring first brightness which is brightness of the overlapping portion in a state in which a specific image is projected on the overlapping portion only from the first projection unit and second brightness which is brightness of the overlapping portion in a state in which the specific image is projected on the overlapping portion only from the second projection unit, and an image generation step of generating data for projecting the specific image, as a first portion in the first data for display, which corresponds to the first superimposed region, generating a second portion in the first data for display, which corresponds to the first non-superimposed region based on first input image data in the data of the projection target image, which corresponds to the first non-superimposed region, and the second brightness, and generating a third portion in the second data for display, which corresponds to the second superimposed region based on second input image data in the data of the projection target image, which corresponds to the second superimposed region, and the first brightness.

An image processing program stored in a non-transitory computer readable metium according to still another aspect of the present invention is an image processing program causing a computer to perform an image processing method in which, for displaying a projection target image by projecting a first image in a first projection range from a first projection unit and projecting a second image in a second projection range that overlaps a part of the first projection range from a second projection unit, the first image and the second image are generated from the projection target image, in which in the image processing method, a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, and the image processing method comprises a brightness acquisition step of acquiring first brightness which is brightness of the overlapping portion in a state in which a specific image is projected on the overlapping portion only from the first projection unit and second brightness which is brightness of the overlapping portion in a state in which the specific image is projected on the overlapping portion only from the second projection unit, and an image generation step of generating a black image as the first superimposed region, generating the first non-superimposed region based on a first input image of the projection target image, which corresponds to the first non-superimposed region, and the second brightness, and generating the second superimposed region based on a second input image of the projection target image, which corresponds to the second superimposed region, and the first brightness.

According to the present invention, it is possible to provide an image processing device for a projection system, a projection system, an image processing method, and an image processing program which can improve an image quality by aligning gradation of a projection image as a whole in a case in which a part of a plurality of images is overlapped and projected.

BRIEF DESCRIPTION OF THE DRAWINGS

FIG. 13 is a flowchart for describing a modification example of the operation of the control device 4 when the projection target image is displayed.

DESCRIPTION OF THE PREFERRED EMBODIMENTS

Hereinafter, embodiments of the present invention will be described with reference to the drawings.

Figure 1:
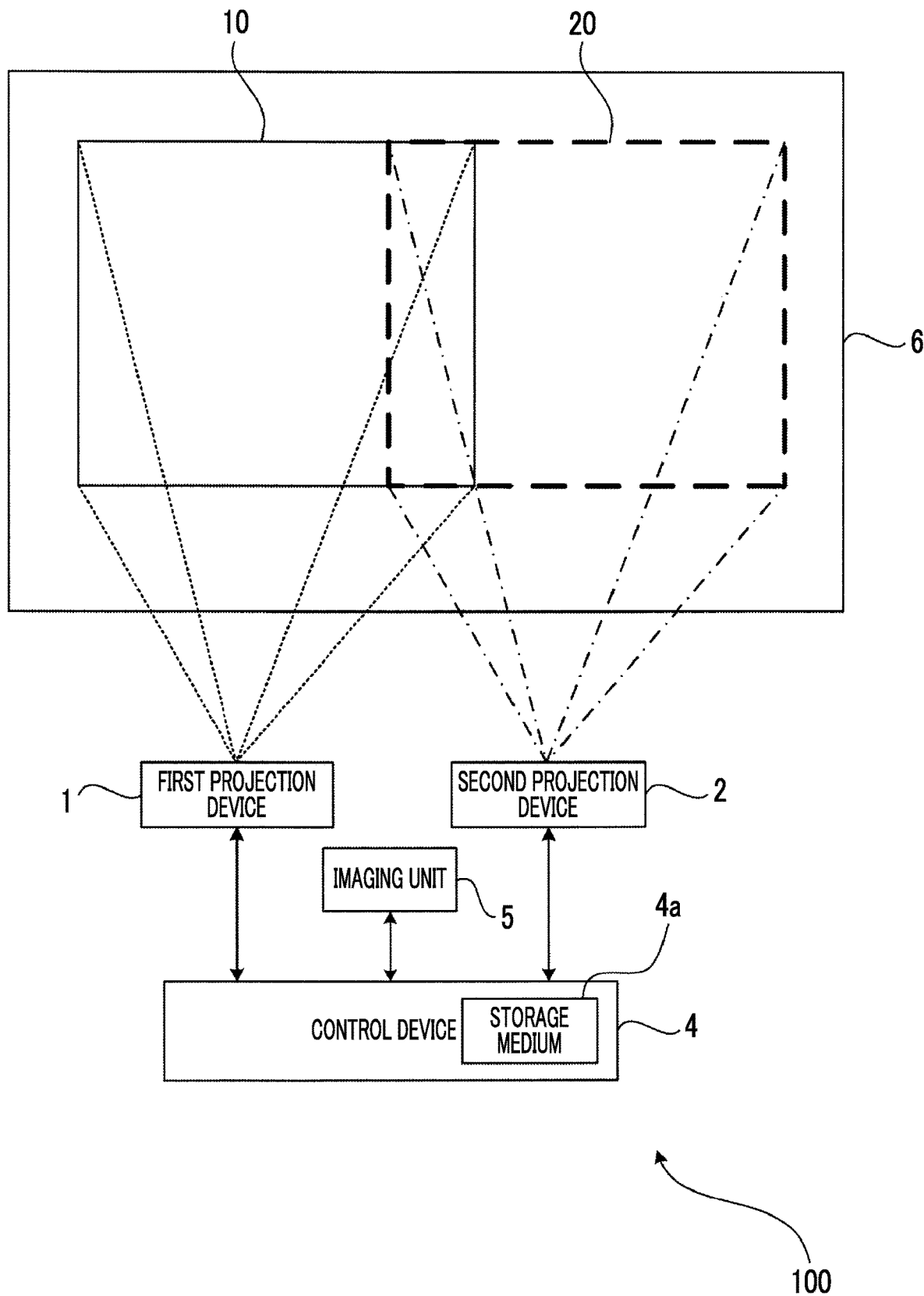
FIG. 1 is a schematic diagram showing a schematic configuration of a projection system 100, which is an embodiment of a projection system of the present invention.

FIG. 1 is a schematic diagram showing a schematic configuration of a projection system 100, which is the embodiment of a projection system of the present invention. The projection system 100 comprises a first projection device 1, a second projection device 2, a control device 4, an imaging unit 5, and a screen 6. Each of the first projection device 1 and the second projection device 2 is a projector of a type that controls gradation of a projection image by controlling a transmission amount of light from a light source, and includes, for example, a liquid crystal projector or a projector using a liquid crystal on silicon (LCOS). Hereinafter, it is assumed that each of the first projection device 1 and the second projection device 2 is the liquid crystal projector.

The projection system 100 displays a horizontally long projection target image by projecting a division image on a first projection range 10 of the screen 6 from the first projection device 1, projecting the division image, from the second projection device 2, on a second projection range 20 of the screen 6 which overlaps a part of the first projection range 10, and joining these two division images.

The control device 4 is a device including a control unit including various processors, a communication interface (not shown) which communicates with each unit, and a storage medium 4*a* such as a hard disk, a solid state drive (SSD), or a read only memory (ROM), and controls the first projection device 1, the second projection device 2, and the imaging unit 5 in an integrated manner.

Examples of the various processors of the control unit of the control device 4 include a central processing unit (CPU), which is a general-purpose processor that executes a program and performs various processing, programmable logic device (PLD), which is a processor whose circuit configuration can be changed after manufacturing, such as field programmable gate array (FPGA), or a dedicated electric circuit, which is a processor having a circuit configuration specially designed for executing specific processing such as an application specific integrated circuit (ASIC), and the like. The structure of these various processors is, more specifically, an electric circuit in which circuit elements such as semiconductor elements are combined. The control unit of the control device 4 may be configured by one of the various processors, or may be configured by a combination of two or more processors of the same type or different types (for example, a combination of a plurality of the FPGAs or a combination of the CPU and the FPGA).

The imaging unit 5 comprises an imaging element such as a charged coupled device (CCD) type image sensor or a metal oxide semiconductor (MOS) type image sensor which images a subject through an imaging optical system, and images at least a range obtained by combining the first projection range 10 and the second projection range 20 on the screen 6. The captured image captured by the imaging unit 5 is input to the control device 4.

Figure 2:
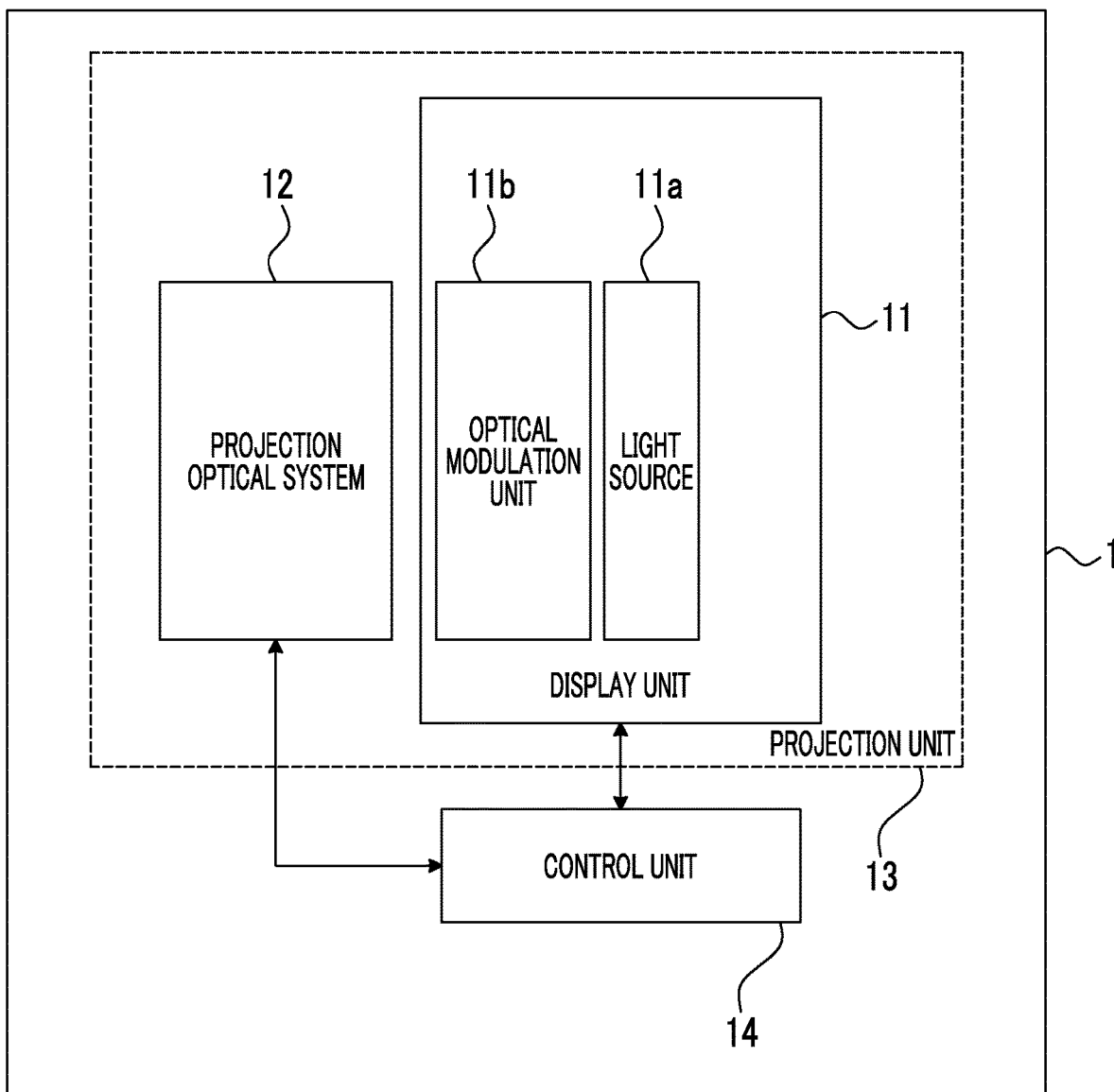
FIG. 2 is a schematic diagram showing an internal configuration of a first projection device 1 shown in FIG. 1.

FIG. 2 is a schematic diagram showing an internal configuration of the first projection device 1 shown in FIG. 1. Note that an internal configuration of the second projection device 2 shown in FIG. 1 is the same as that of the first projection device 1, and thus the description thereof will be omitted. The first projection device 1 comprises a projection unit 13 and a control unit 14.

The projection unit 13 comprises a display unit 11 including a light source 11a and an optical modulation unit 11b, and a projection optical system 12.

The light source 11a includes a light emitting element such as a laser or a light emitting diode (LED), and emits white light, for example.

The optical modulation unit 11b includes three liquid crystal panels which modulate, based on image information, each color light emitted from the light source 11a and separated into three colors of red, blue, and green by a color separation mechanism (not shown) to emit each color image. These three liquid crystal panels may be equipped with red, blue, and green filters, respectively, and modulate the white light emitted from the light source 11a by each liquid crystal panel to emit each color image.

The projection optical system 12 receives light from the display unit 11, and includes, for example, a relay optical system including at least one lens. The light passing through the projection optical system 12 is projected on the screen 6.

The control unit 14 controls the projection unit 13 based on data for display input from the control device 4 to project an image based on the data for display on the screen 6. The data for display input to the control unit 14 includes three of data for red display, data for blue display, and data for green display.

In each of the first projection device 1 and the second projection device 2, brightness of the light emitted from the light source 11a can be set in k stages (k is a natural number of 2 or more). The brightness of the projection target image projected on the screen 6 can be adjusted by changing the brightness setting.

Figure 3:
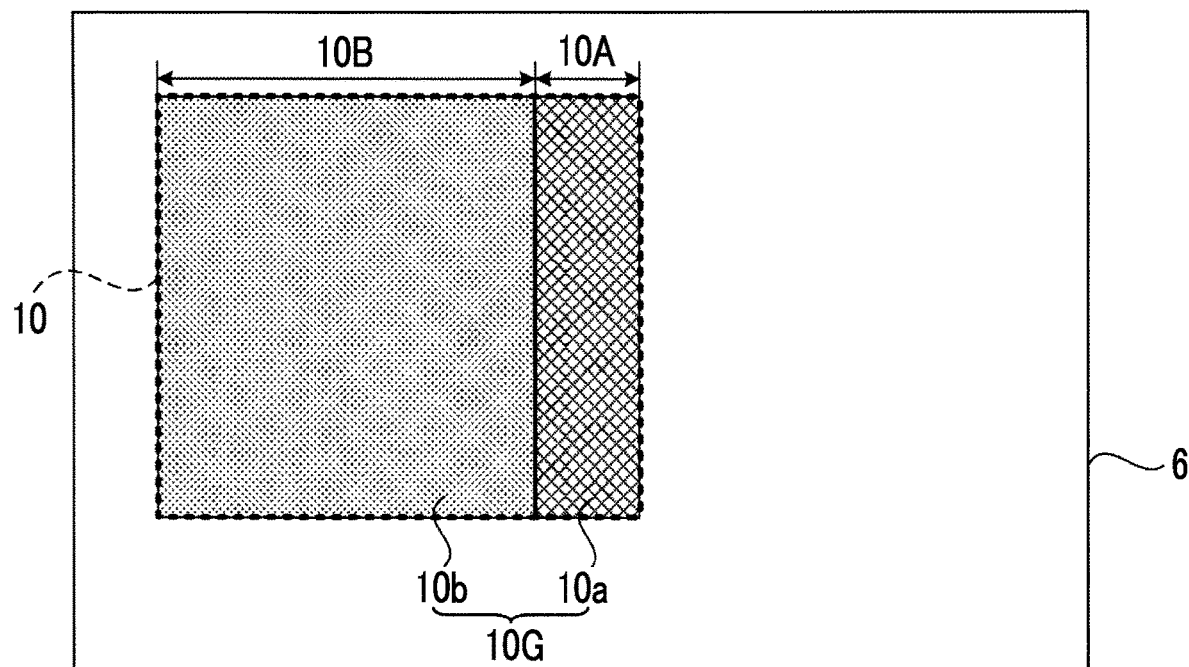
FIG. 3 is a diagram schematically showing an image projected on a first projection range from the first projection device 1 when a projection target image is displayed.

FIG. 3 is a diagram schematically showing the image projected on the first projection range 10 from the first projection device 1 when the projection target image is displayed. When the projection target image is displayed, as shown in FIG. 3, a first division image 10G is projected on the first projection range 10. The first division image 10G includes a first non-superimposed region 10b and a first superimposed region 10a. First data for display used for projecting the first division image 10G is generated by the control device 4 and input to the control unit 14 of the first projection device 1.

The first superimposed region 10a is a region projected on an overlapping portion 10A of the first projection range 10 with the second projection range 20. The first superimposed region 10a of the first division image 10G is generated based on a first portion in the first data for display, which corresponds to the first superimposed region 10a, input to the control unit 14 of the first projection device 1. The first portion of the first data for display is data in which brightness values of all pixels in each color (red, blue, and green) are set to the minimum value (specifically, "0") (hereinafter referred to as black image data). Here, even in a case in which the first portion is the black image data, a lower limit value of a light transmission amount of each pixel in the optical modulation unit 11b is not "0", so that the first superimposed region is an image region having slight brightness. Hereinafter, the image projected on the screen 6 based on the black image data is referred to as a black image.

The first non-superimposed region 10b is a region projected on a non-overlapping portion 10B of the first projection range 10 with the second projection range 20. The first non-superimposed region 10b is generated based on a second portion in the first data for display, which corresponds to the first non-superimposed region 10b. In the second portion of the first data for display, the brightness value of each pixel in each color is a value determined based on the data of the projection target image input to the control device 4.

Figure 4:
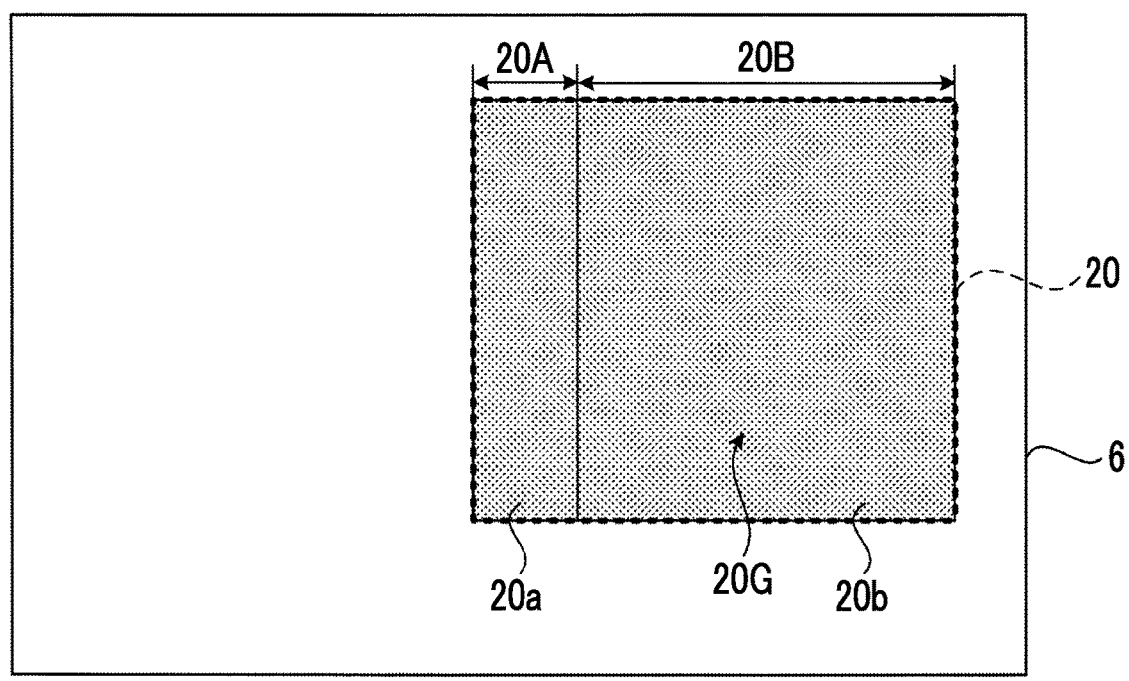
FIG. 4 is a diagram schematically showing an image projected on a second projection range 20 from a second projection device 2 when a projection target image is displayed.

FIG. 4 is a diagram schematically showing an image projected on the second projection range 20 from the second projection device 2 when the projection target image is displayed. When the projection target image is displayed, as shown in FIG. 4, a second division image 20G is projected on the second projection range 20. The second division image 20G includes a second superimposed region 20a and a second non-superimposed region 20b. Second data for display used for projecting the second division image 20G is generated by the control device 4 and input to the control unit 14 of the second projection device 2.

The second superimposed region 20a is a region projected on an overlapping portion of the second projection range 20 with the first projection range 10. The second superimposed region 20a is generated based on a third portion in the second data for display, which corresponds to the second superimposed region 20a. In the third portion of the second data for display, the brightness value of each pixel in each color is a value determined based on the data of the projection target image input to the control device 4.

The second non-superimposed region 20b is a region projected on a non-overlapping portion 20B of the second projection range 20 with the first projection range 10. The second non-superimposed region 20b is generated based on a fourth portion in the second data for display, which corresponds to the second non-superimposed region 20b. In the fourth portion of the second data for display, the brightness value of each pixel in each color is a value determined based on the data of the projection target image input to the control device 4.

As shown in FIGS. 3 and 4, in a case in which the projection target image is displayed, in the overlapping portion 10A of the first projection range 10 (synonymous with the overlapping portion 20A of the second projection range 20), the black image (first superimposed region 10a) having slight brightness and the image (second superimposed region 20a) based on the data of the projection target image are displayed in an overlapping manner. Therefore, in the displayed projection target image, there is a difference between the minimum brightness of the image in the overlapping portion 10A (20A) and the minimum brightness of the image in other portions. The control device 4 performs image processing of correcting the difference in the minimum brightness.

Figure 5:
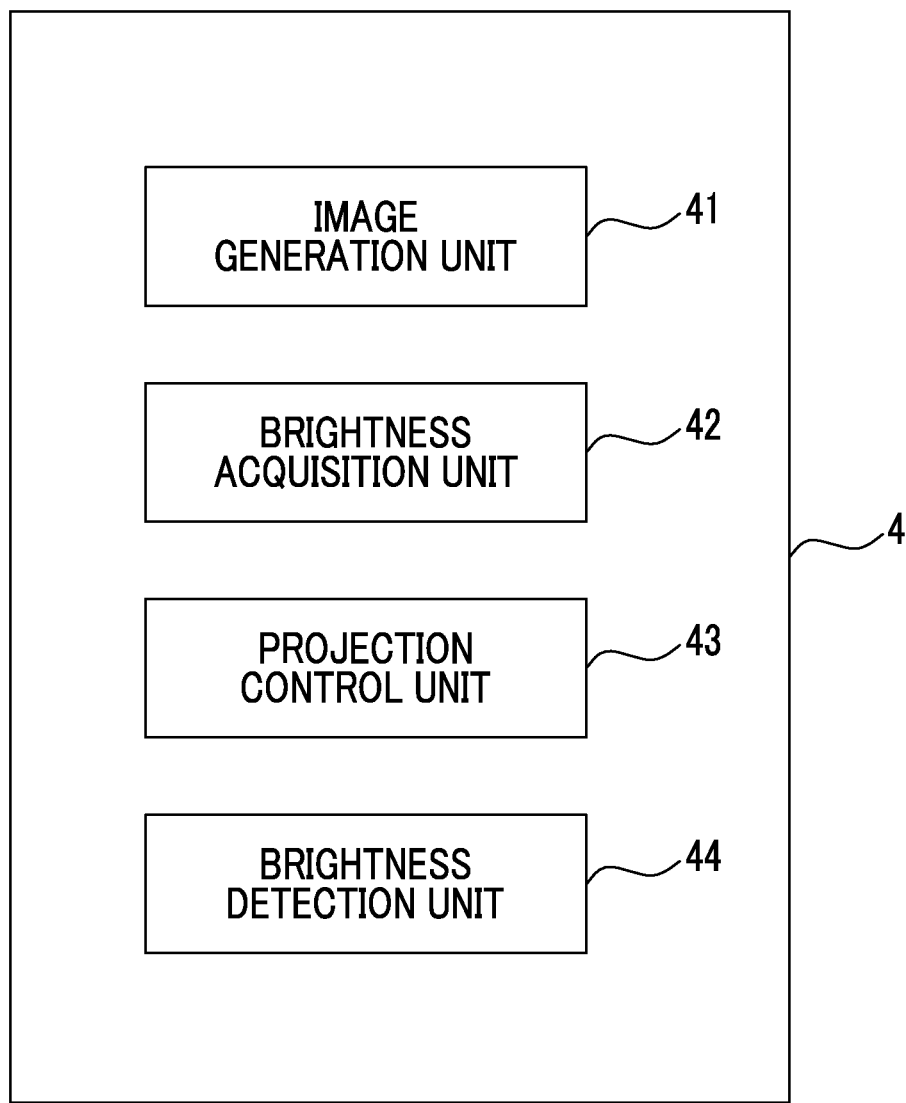
FIG. 5 is a functional block diagram of a control device 4 shown in FIG. 1.

FIG. 5 is a functional block diagram of the control device 4 shown in FIG. 1. The control unit of the control device 4 executes a program including an image processing program to function as an image processing device including an image generation unit 41, a brightness acquisition unit 42, a projection control unit 43, and a brightness detection unit 44.

The image generation unit 41 generates the first data for display used for projecting the first division image 10G from the first projection device 1 and second data for display used for projecting the second division image 20G from the second projection device 2, from the data (hereinafter, also referred to as input image data) of the projection target image input from an external device such as a personal computer or the like.

The brightness acquisition unit 42 acquires, from the storage medium 4a, first brightness (brightness BL1(n) described below), which is the brightness of the overlapping portion 10A (20A) in a state in which the black image is projected on the overlapping portion 10A (20A) only from the first projection device 1, and second brightness (brightness BL2(n) described below), which is the brightness of the overlapping portion 10A (20A) in the state in which the black image is projected on the overlapping portion 10A (20A) only from the second projection device 2.

In the projection system 100, an adjustment mode is provided in which the first brightness and the second brightness are measured in a state in which the black image is projected on the screen 6 and stored in the storage medium 4a. The brightness acquisition unit 42 acquires, by the adjustment mode, the first brightness and the second brightness stored in the storage medium 4a from the storage medium 4a. The projection control unit 43 and the brightness detection unit 44 are blocks that function in the adjustment mode. Hereinafter, an operation in the adjustment mode will be described.

Figure 6:
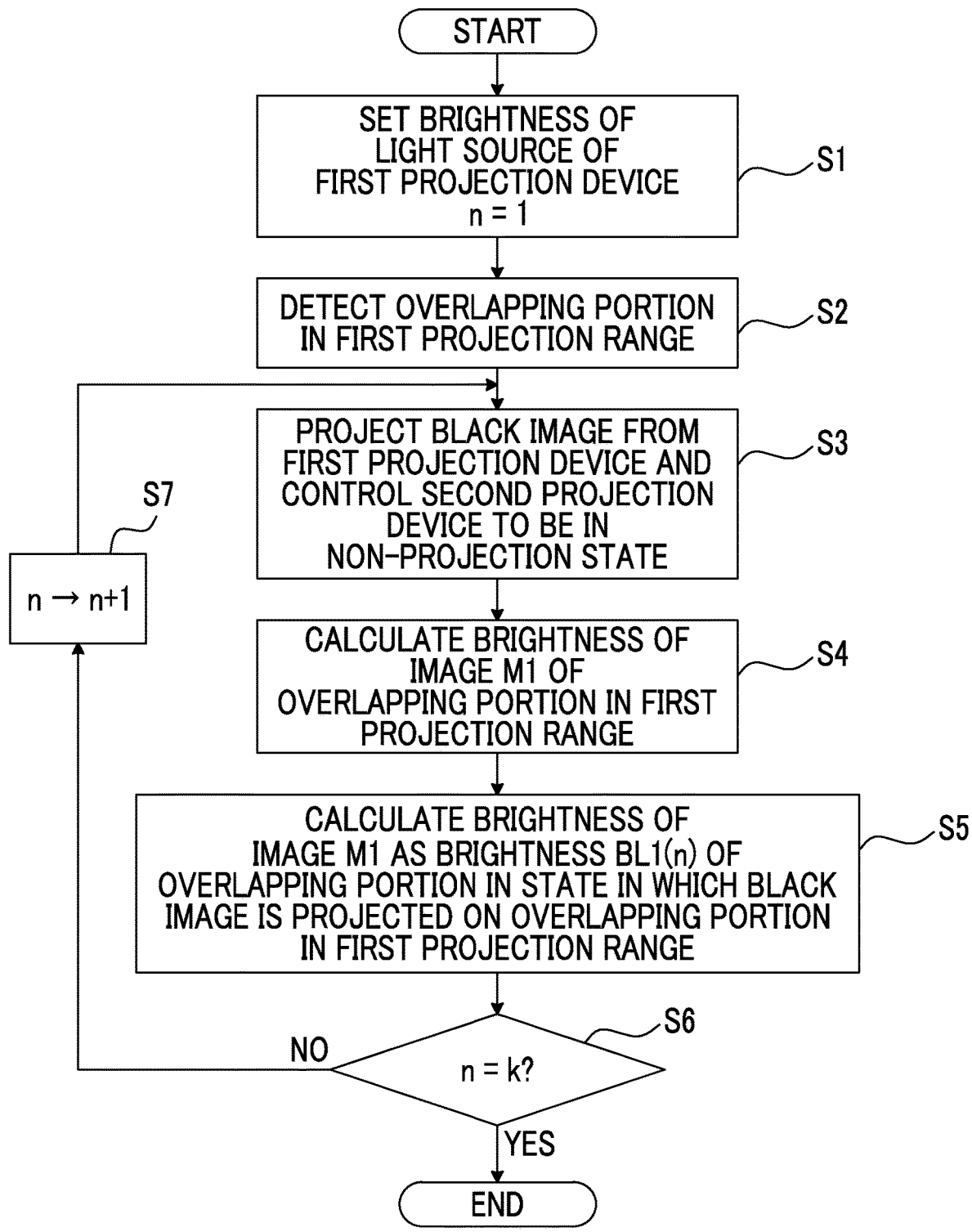
FIG. 6 is a flowchart for describing a measurement operation of first brightness in an adjustment mode.
Figure 7:
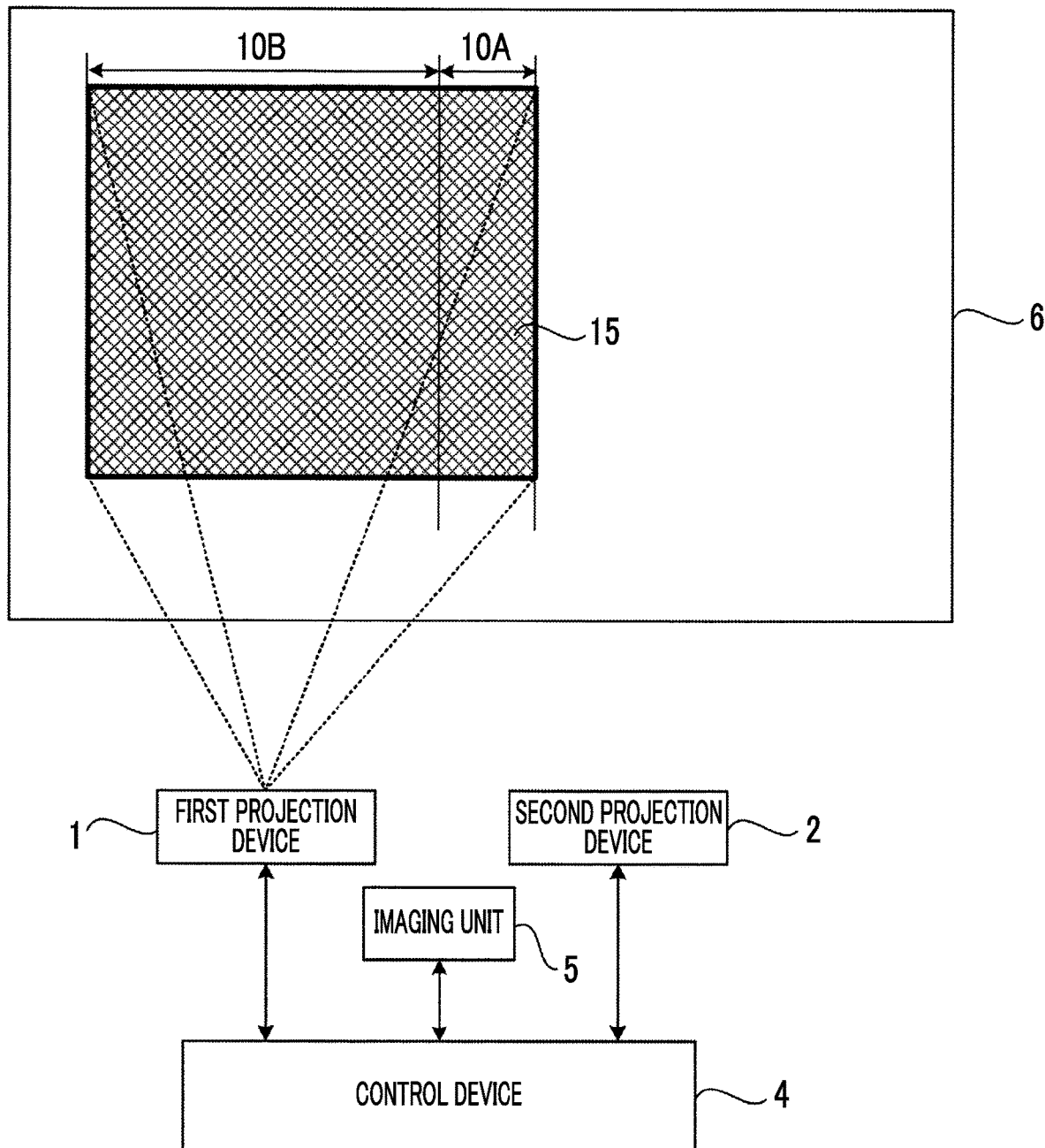
FIG. 7 is a schematic diagram showing an image projected on a screen 6 when the first brightness is measured.

FIG. 6 is a flowchart for describing a measurement operation of the first brightness in the adjustment mode. FIG. 7 is a schematic diagram showing the image projected on the screen 6 when the first brightness is measured.

The projection control unit 43 sets a brightness set value n of the light source 11a of the first projection device 1 to, for example, the minimum value "1" of the k stages (step S1).

Next, the brightness detection unit 44 projects, for example, an image of a rectangular frame on the screen 6 from the first projection device 1, acquires the captured image obtained by imaging the screen 6 by the imaging unit 5 in that state, detects a position of the rectangular frame from the captured image, recognizes the first projection range 10 on the screen 6, and detects the overlapping portion 10A in the first projection range 10 (step S2).

The overlapping portion 10A in the first projection range 10 can be detected based on information on a distance between the first projection device 1 and the second projection device 2, information of an angle formed by a direction of an optical axis of the first projection device 1 and a direction of an optical axis of the second projection device 2, and the like. These pieces of information may be manually input to the control device 4, or may be automatically determined by the control device 4 by sensors and the like provided in the first projection device 1 and the second projection device 2.

Next, the projection control unit 43 projects the black image on the screen 6 from the first projection device 1, and controls the second projection device 2 to be in a non-image projection state (step S3). By the process of step S3, as shown in FIG. 7, a black image 15 based on the black image data is projected on the first projection range 10 of the screen 6. As described above, the black image 15 is an image having slight brightness due to a characteristic of the optical modulation unit 11b of the first projection device 1.

Next, the brightness detection unit 44 acquires the captured image obtained by imaging the screen 6 by the imaging unit 5 in a state shown in FIG. 7, acquires an image M1 of the overlapping portion 10A in the captured image, and calculates brightness (for example, an average value of the brightness values of all the pixels or a median value of the brightness values of all the pixels) of the image M1 (step S4).

Next, the brightness detection unit 44 uses the brightness of the image M1 calculated in step S4 as the brightness BL1(n) of the overlapping portion 10A in a state in which the black image is projected on the overlapping portion 10A of the first projection range 10 and stores the calculated brightness in the storage medium 4a (step S5). A value of "n" in step S5 is the value set in step S1. The brightness BL1(n) is the above-described first brightness.

Next, in a case in which the brightness set value n is not k (step S6: NO), the projection control unit 43 increases the brightness set value n by one in step S7 and shifts the process to step S3, and in a case in which the brightness set value n is k (step S6: YES), the projection control unit 43 terminates the process. As a result, k pieces of first brightness (BL1(1), BL1(2), . . . , BL1(k)) are stored in the storage medium 4a.

Figure 8:
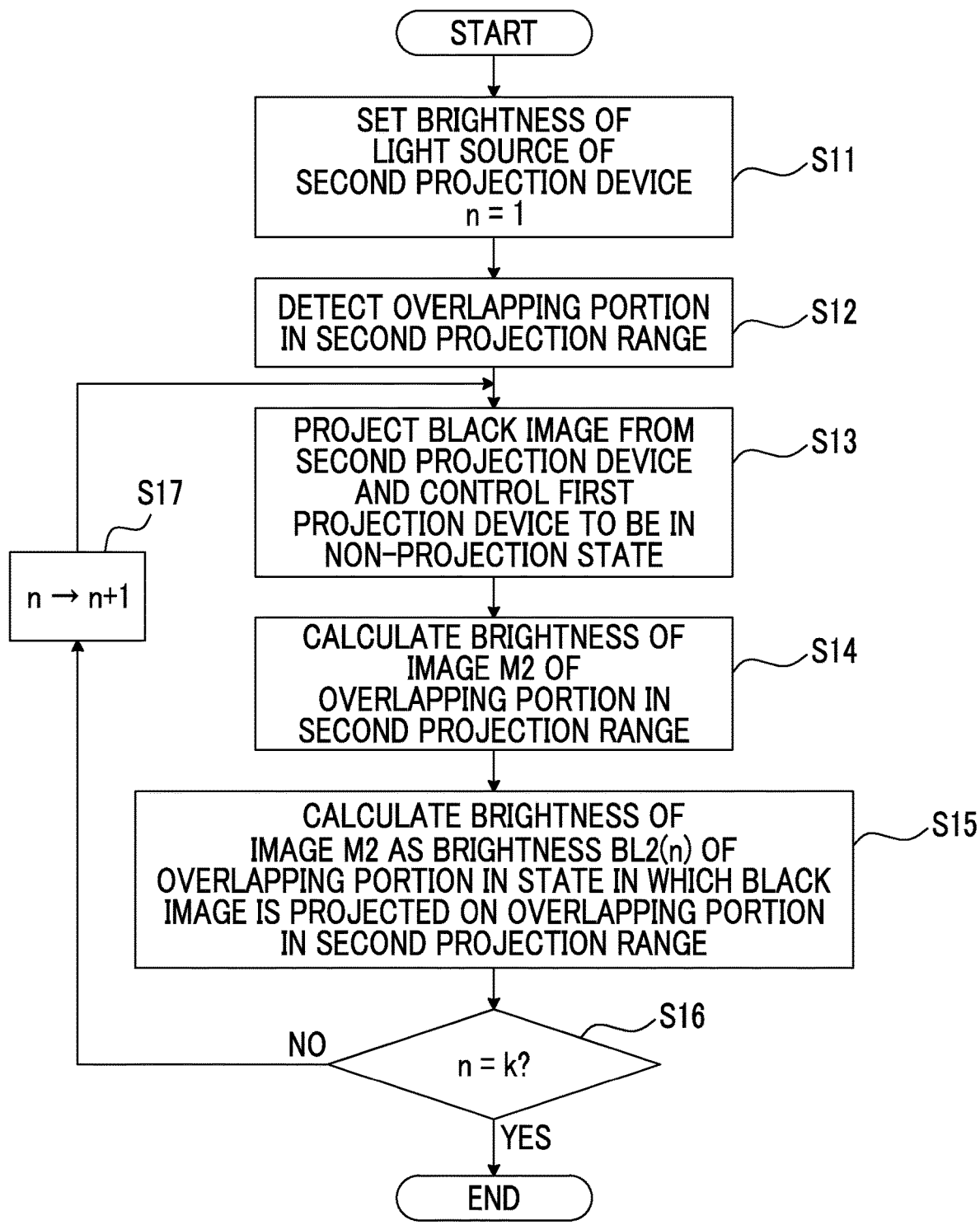
FIG. 8 is a flowchart for describing a measurement operation of second brightness in the adjustment mode.
Figure 9:
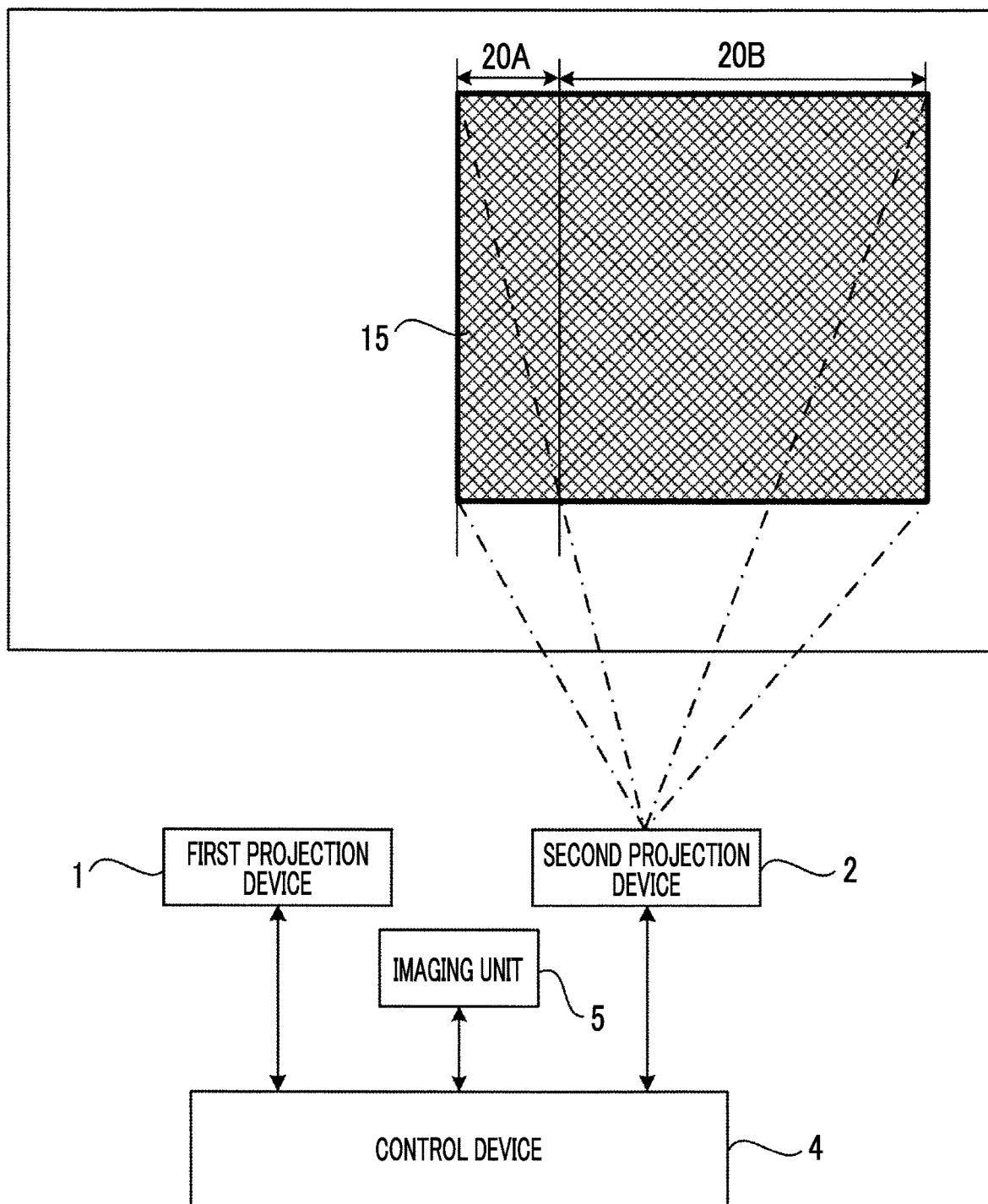
FIG. 9 is a schematic diagram showing an image projected on the screen 6 when the second brightness is measured.

FIG. 8 is a flowchart for describing a measurement operation of the second brightness in the adjustment mode. FIG. 9 is a schematic diagram showing the image projected on the screen 6 when the second brightness is measured.

The projection control unit 43 sets a brightness set value n of the light source 11a of the second projection device 2 to, for example, the minimum value "1" of the k stages (step S11).

Next, the brightness detection unit 44 projects, for example, an image of a rectangular frame on the screen 6 from the second projection device 2, acquires the captured image obtained by imaging the screen 6 by the imaging unit 5 in that state, detects a position of the rectangular frame from the captured image, recognizes the second projection range 20 on the screen 6, and detects the overlapping portion 20A in the second projection range 20 (step S12).

The overlapping portion 20A in the second projection range 20 can be detected based on information on a distance between the first projection device 1 and the second projection device 2, information of an angle formed by a direction of an optical axis of the first projection device 1 and a direction of an optical axis of the second projection device 2, and the like. These pieces of information may be manually input to the control device 4, or may be automatically determined by the control device 4 by sensors and the like provided in the first projection device 1 and the second projection device 2.

Next, the projection control unit 43 projects the black image on the screen 6 from the second projection device 2, and controls the first projection device 1 to be in a non-image projection state (step S13). By the process of step S13, as shown in FIG. 9, a black image 15 based on the black image data is projected on the second projection range 20 of the screen 6. As described above, the black image 15 is an image having slight brightness due to a characteristic of the optical modulation unit 11b of the second projection device 2.

Next, the brightness detection unit 44 acquires the captured image obtained by imaging the screen 6 by the imaging unit 5 in a state shown in FIG. 9, acquires an image M2 of the overlapping portion 20A in the captured image, and calculates brightness (for example, the average value of the brightness values of all the pixels or the median value of the brightness values of all the pixels) of the image M2 (step S14).

Next, the brightness detection unit 44 uses the brightness of the image M2 calculated in step S14 as the brightness BL2(n) of the overlapping portion 20A in a state in which the black image is projected on the overlapping portion 20A of the second projection range 20 and stores the calculated brightness in the storage medium 4a (step S15). A value of "n" in step S15 is the value set in step S11. The brightness BL2(n) is the above-described second brightness.

Next, in a case in which the brightness set value n is not k (step S16: NO), the projection control unit 43 increases the brightness set value n by one in step S17 and shifts the process to step S13, and in a case in which the brightness set value n is k (step S16: YES), the projection control unit 43 terminates the process. As a result, k pieces of second brightness (BL2(1), BL2(2), . . . , BL2(k)) are stored in the storage medium 4a.

The image generation unit 41 shown in FIG. 5 generates the black image data as the first portion (data for projecting the first superimposed region 10a) in the first data for display, which corresponds to the first superimposed region 10a, and generates the second portion (data for projecting the first non-superimposed region 10b) in the first data for display, which corresponds to the first non-superimposed region 10b, based on the first input image data in the input image data, which corresponds to the first non-superimposed region 10b, and the brightness BL2(n).

Further, the image generation unit 41 generates the third portion (data for projecting the second superimposed region 20a) in the second data for display, which corresponds to the second superimposed region 20a, based on the second input image data in the input image data, which corresponds to the second superimposed region 20a, and the brightness BL1(n).

Further, the image generation unit 41 generates the fourth portion (data for projecting the second non-superimposed region 20b) in the second data for display, which corresponds to the second non-superimposed region 20b, based on the third input image data in the input image data, which corresponds to the second non-superimposed region 20b, and the brightness BL1(n).

Figure 10:
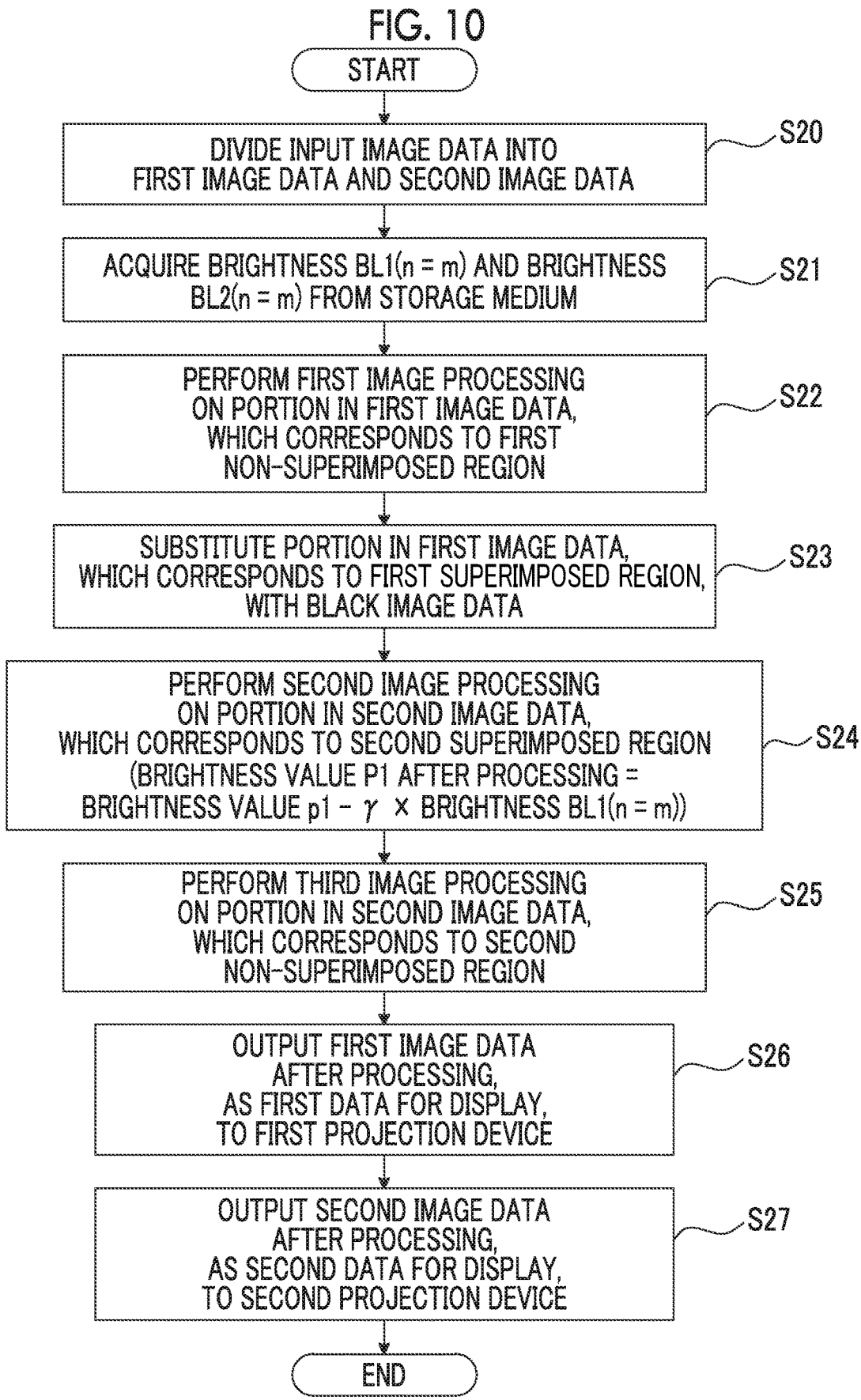
FIG. 10 is a flowchart for describing an operation of the control device 4 when the projection target image is displayed.
Figure 11:
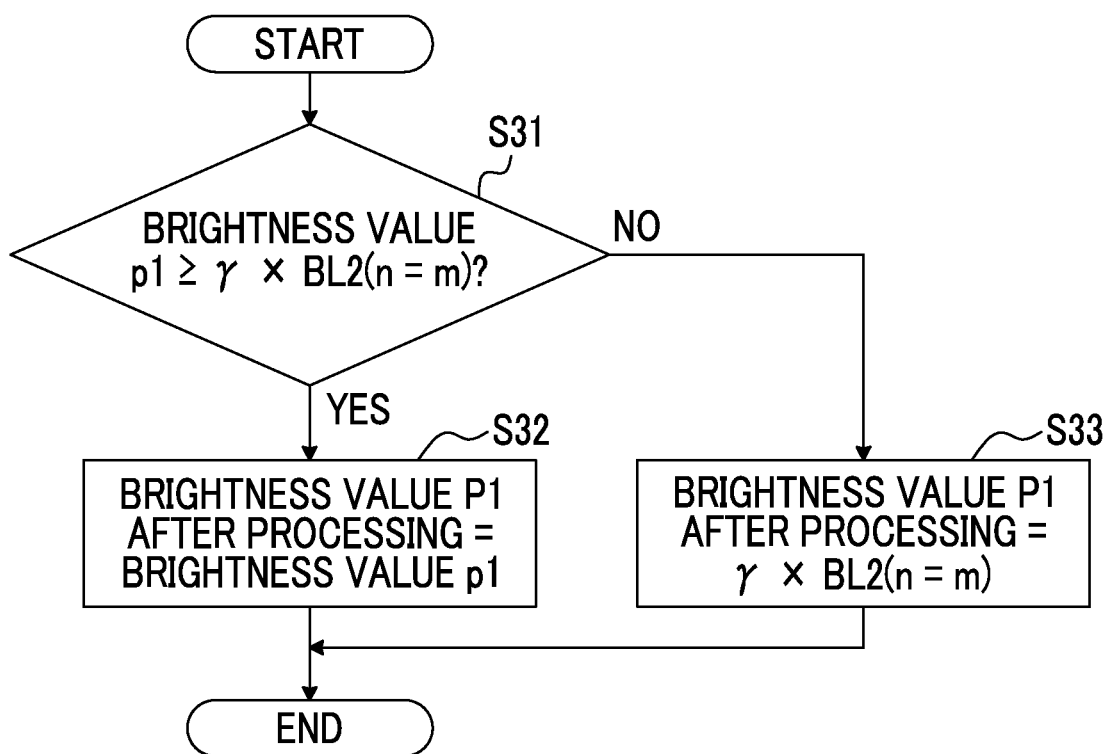
FIG. 11 is a flowchart for describing the details of first image processing in step S22 of FIG. 10.
Figure 12:
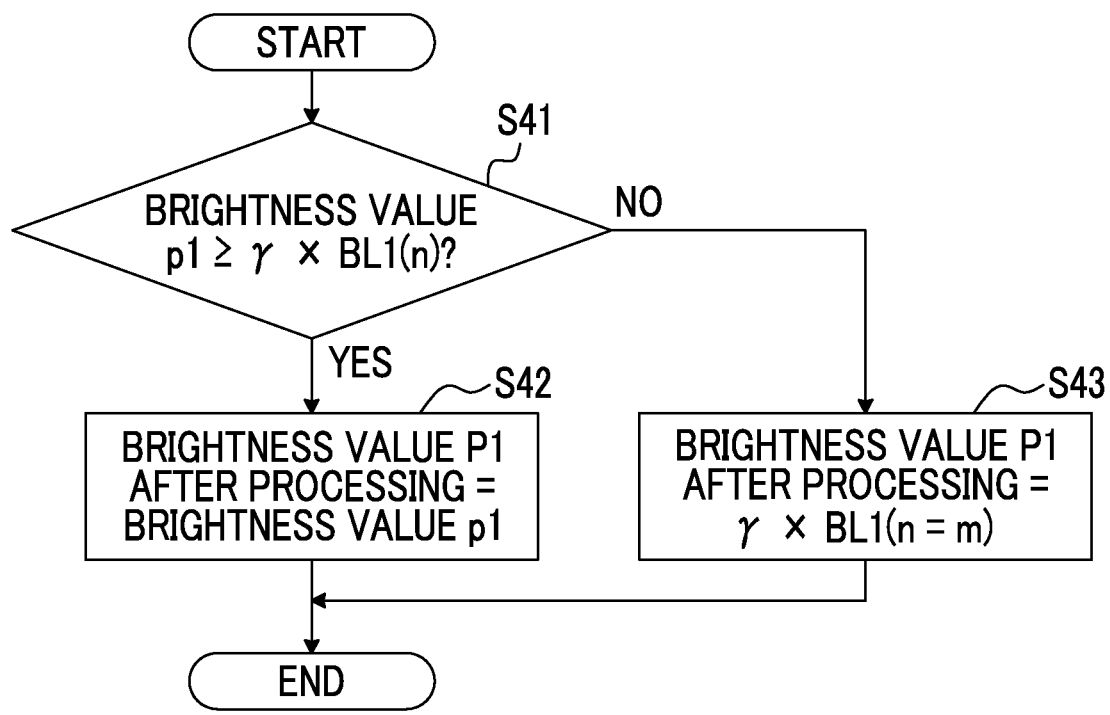
FIG. 12 is a flowchart for describing the details of second image processing in step S25 of FIG. 10.

FIG. 10 is a flowchart for describing an operation of the control device 4 when the projection target image is displayed. FIG. 11 is a flowchart for describing the details of first image processing in step S22 of FIG. 10. FIG. 12 is a flowchart for describing the details of second image processing in step S25 of FIG. 10. Here, the operation when the projection target image is displayed in the state in which the brightness set values n of the first projection device 1 and the second projection device 2 are set to m (m is any one of 1 to k) will be described.

In a case in which the input image data is acquired, the image generation unit 41 divides the input image data into first image data for projecting the input image data in the first projection range 10 and second image data for projecting in the second projection range 20 (step S20). Specifically, the image generation unit 41 trims a portion of the input image data, which corresponds to the first projection range 10, to obtain the first image data, and trims a portion of the input image data, which corresponds to the second projection range 20, to obtain the second image data.

Next, the brightness acquisition unit 42 acquires, from the storage medium 4a, the first brightness (brightness BL1(n=m)) and the second brightness (brightness BL2(n=m)), which correspond to the brightness set value m (step S21).

Next, the image generation unit 41 performs the first image processing on the portion in the first image data, which corresponds to the first non-superimposed region 10b (first input image data described above) (step S22). Specifically, the image generation unit 41 performs the process shown in FIG. 11 with respect to a brightness value p1 of each pixel of each color (red, blue, and green) image data of the first input image data. First, the image generation unit 41 compares a value $\{\gamma \times BL2(n=m)\}$, which is obtained by multiplying the brightness BL2(n=m) acquired in step S21 by a coefficient $\gamma$, with the brightness value p1 of a processing target. The coefficient $\gamma$ is a coefficient for correcting the brightness value of each pixel of the data for display of any image such that the brightness of the image projected on the screen 6 is the brightness BL2(n).

In a case in which the brightness value p1 of the processing target is equal to or more than $\{\gamma \times BL2(n=m)\}$ (step S31: YES), the image generation unit 41 sets the brightness value p1 of the processing target as it is, as the brightness value P1 after the first image processing (step S32).

In a case in which the brightness value p1 of the processing target is less than $\{\gamma \times BL2(n=m)\}$ (step S31: NO), the image generation unit 41 sets $\{\gamma \times BL2(n=m)\}$, as the brightness value P1 after third image processing (step S33).

Next, the image generation unit 41 substitutes the portion in the first image data, which corresponds to the first superimposed region 10a, with the black image data (step S23).

Next, the image generation unit 41 performs the second image processing on the portion in the second image data, which corresponds to the second superimposed region 20a (second input image data described above) (step S24). Specifically, the image generation unit 41 generates each brightness value P1 after the processing by subtracting, from the brightness value p1 of each pixel of each color (red, blue, and green) image data of the second input image data, a value $\{\gamma \times BL1(n=m)\}$ obtained by multiplying the brightness BL1(n=m) acquired in step S21 by the coefficient $\gamma$.

Next, the image generation unit 41 performs the third image processing on the portion in the second image data, which corresponds to the second non-superimposed region 20b (third input image data described above) (step S25). Specifically, the image generation unit 41 performs the process shown in FIG. 12 with respect to the brightness value p1 of each pixel of each color (red, blue, and green) image data of the second input image data. First, the image generation unit 41 compares a value $\{\gamma \times BL1(n=m)\}$, which is obtained by multiplying the brightness BL1(n=m) acquired in step S21 by the coefficient $\gamma$, with the brightness value p1 of the processing target.

In a case in which the brightness value p1 of the processing target is equal to or more than $\{\gamma \times BL1(n=m)\}$ (step S41: YES), the image generation unit 41 sets the brightness value p1 of the processing target as it is, as the brightness value P1 after the third image processing (step S42).

In a case in which the brightness value p1 of the processing target is less than $\{\gamma \times BL1(n=m)\}$ (step S41: NO), the image generation unit 41 sets $\{\gamma \times BL1(n=m)\}$, as the brightness value P1 after the third image processing (step S43).

Then, the image generation unit 41 outputs, as the first data for display, the first image data after the image processing obtained in the processes of steps S22 and S23 to the control unit 14 of the first projection device 1 (step S26) and outputs, as the second data for display, the second image data after image processing obtained in the processes of steps S24 and S25 to the control unit 14 of the second projection device 2 (step S27).

As described above, with the projection system 100, the brightness value of each pixel is uniformly reduced by $\{\gamma \times BL1(n)\}$ for the portion in the second data for display, which corresponds to the second superimposed region 20a. That is, in a case of the brightness set value n=m, the brightness of the image projected on the overlapping portion 10A based on this portion is reduced by $BL1(n=m)$.

Further, the portion in the first data for display, which corresponds to the first superimposed region 10a, is the black image data. Therefore, in a case of the brightness set value n=m, the brightness of the black image projected on the overlapping portion 10A based on the black image data is $BL1(n=m)$. That is, the overlapping portion 10A is in a state in which the image of which the brightness is reduced by $BL1(n=m)$ and the image of which the brightness is $BL1(n=m)$ are superimposed and these pieces of the brightness are offset, and the minimum value of the brightness of the image projected on the overlapping portion 10A is the brightness $BL2(n=m)$.

On the other hand, for the portion in the first data for display, which corresponds to the first non-superimposed region 10b, the brightness value of the pixel having the brightness value less than $\{\gamma \times BL2(n)\}$ is increased to $\{\gamma \times BL2(n)\}$. Further, for the portion in the second data for display, which corresponds to the second non-superimposed region 20b, the brightness value of the pixel having the brightness value less than $\{\gamma \times BL1(n)\}$ is increased to $\{\gamma \times BL1(n)\}$. That is, a lower limit value of the brightness of the image projected on the non-overlapping portion 10B in a case of the brightness set value n=m is $BL2(n=m)$, and the lower limit value of the brightness of the image projected on the non-overlapping portion 20B in a case of the brightness set value n=m is $BL1(n=m)$. $BL1(n)$ and $BL2(n)$ are the same except for individual differences in the devices or environmental conditions. That is, a difference between $BL1(n)$ and $BL2(n)$ is negligibly small.

Therefore, with the projection system 100, the minimum brightness of the image projected on the non-overlapping portion 10B, the minimum brightness of the image projected on the overlapping portion 10A, and the minimum brightness of the image projected on the non-overlapping portion 20B can be set to substantially the same value, and it is possible to obtain a state in which the gradation of the displayed projection target image is aligned as a whole.

Since such an effect can be obtained by simple processing such as the first image processing, the second image processing, and the third image processing, which are described above, it is possible to improve the projection image quality while reducing the system construction cost.

Further, with the projection system 100, since the adjustment mode is provided, even in a case in which various situations occur, such as a change in installation locations of the first projection device 1 and the second projection device 2, a change in a reflection characteristic of the screen 6, and a change in each model of the first projection device 1 and the second projection device 2, the first brightness and the second brightness in that situation can be acquired, and the quality of the projection target image can be improved.

Further, with the projection system 100, the first brightness and the second brightness for each brightness set value n are stored in the storage medium 4a, and the first image processing, the second image processing, and the third image processing are performed based on the first brightness and the second brightness which correspond to the brightness set value when the projection target image is displayed. Therefore, the projection image quality can be improved by aligning the gradation regardless of the brightness setting at the time of image projection.

Note that in the above description, it has been described that the projection system 100 has the adjustment mode, but the adjustment mode is not essential. For example, when the control device 4 is manufactured, the first brightness and the second brightness may be measured by the methods shown in FIGS. 6 to 9 in a factory or the like, the measured first brightness and second brightness may be stored in the storage medium 4a, and then the control device 4 may be shipped. With this configuration, the projection image quality can be sufficiently improved as long as the projection system 100 is assumed to be used only in a specific place. Further, the manufacturing cost of the control device 4 can be reduced.

FIG. 13 is a flowchart for describing a modification example of the operation of the control device 4 when the projection target image is displayed. The flowchart shown in FIG. 13 is the same as that of FIG. 10 except that steps S51 to S54 are added. In FIG. 13, the same process as in FIG. 10 is designated by the same reference numeral and the description thereof will be omitted.

After step S21, the image generation unit 41 determines whether or not each of the brightness $BL1(n=m)$ and the brightness $BL2(n=m)$ is equal to or less than a threshold value (step S51). In a case in which any one of the brightness $BL1(n=m)$ or the brightness $BL2(n=m)$ exceeds the threshold value (step S51: NO), the image generation unit 41 performs the processes after step S22.

In a case in which both the brightness $BL1(n=m)$ and the brightness $BL2(n=m)$ are equal to or less than the threshold value (step S51: YES), the image generation unit 41 performs the processes after step S52. In step S52, the image generation unit 41 substitutes the portion in the first image data, which corresponds to the first superimposed region 10a with the black image data. Then, the image generation unit 41 outputs, as the first data for display, the first image data after the processing in step S51 to the control unit 14 of the first projection device 1 (step S53), and outputs, as the second data for display, the second image data generated in step S20 as it is to the control unit 14 of the second projection device 2 (step S54).

According to this modification example, in a case in which the brightness set value of the light source 11a when the projection target image is displayed is low or a case in which the first brightness and the second brightness are negligibly small due to the reflection characteristic of the screen 6, the use environment of the projection system 100, the performance of each projection device, and the like, the image processing in steps S22 to S27 is not performed.

In this case, the lower limit value of the brightness of the image projected on the non-overlapping portion 10B is the first brightness, the lower limit value of the brightness of the image projected on the overlapping portion 10A is a total value of the first brightness and the second brightness, and the lower limit value of the brightness of the image projected on the non-overlapping portion 20B is the second brightness. However, since the first brightness and the second brightness are very small values, the difference in the minimum brightness in the entire projection target image is inconspicuous. Further, in this case, the gradation of the projection target image can be improved and the quality of the projection image can be improved as compared with the case in which the processes after step S22 are performed.

Up to this point, the projection system 100 has been described to have two projection devices, but the control device 4 may be connected to three or more projection devices to control the projection devices. Even in this case, the projection target image can be displayed on the large screen with high image quality.

Further, the first portion in the first data for display need only have the brightness values of all the pixels in each color (red, blue, and green) close to the minimum value and need not be the black image data. For example, the first portion may be gray image data for displaying a so-called gray image in which the brightness values of all the pixels are slightly higher than the minimum value. In this case, all the black images in the adjustment mode described with reference to FIGS. 6 to 9 need only be replaced with the gray images. Further, the "black image data" in step S23 of FIGS. 10 and 13 and step S52 of FIG. 13 need only be replaced with the "gray image data".

Also, in FIGS. 10 and 13, step S25 may be omitted. Even in this case, since the minimum brightness of the image projected on the non-overlapping portion 10B and the minimum brightness of the image projected on the overlapping portion 10A can be set to substantially the same value, the image quality of the projection target image can be improved as compared with the case in which the first image processing and the second image processing are not performed.

Although in the projection system 100, the imaging unit 5 is provided independently, the imaging unit 5 may be built in the first projection device 1 and the second projection device 2.

At least the following matters are described in the present specification. Note that the components and the like corresponding to the above embodiments are shown in parentheses, but the present invention is not limited thereto.

(1) An image processing device (control device 4) for a projection system (projection system 100) that displays a projection target image by projecting a first image (first division image 10G) in a first projection range (first projection range 10) from a first projection unit (projection unit 13 of first projection device 1) and projecting a second image (second division image 20G) in a second projection range (second projection range 20) that overlaps a part of the first projection range from a second projection unit (projection unit 13 of second projection device 2), in which a region of the first image, which is projected on an overlapping portion (overlapping portion of the first projection range and the second projection range, is defined as a first superimposed region (first superimposed region 10a) and a region of the first image other than the first superimposed region is defined as a first non-superimposed region (first non-superimposed region 10b), a region of the second image, which is projected on the overlapping portion, is defined as a second superimposed region (second superimposed region 20a) and a region of the second image other than the second superimposed region is defined as a second non-superimposed region (second non-superimposed region 20b), the image processing device comprises an image generation unit (image generation unit 41) that generates first data for display of the first image and second data for display of the second image from data of the projection target image, and a brightness acquisition unit (brightness acquisition unit 42) that acquires first brightness (brightness $BL1(n)$) which is brightness of the overlapping portion in a state in which a specific image (black image 15) is projected on the overlapping portion only from the first projection unit and second brightness (brightness $BL2(n)$) which is brightness of the overlapping portion in a state in which the specific image is projected on the overlapping portion only from the second projection unit, and the image generation unit generates data (black image data) for projecting the specific image, as a first portion, which corresponds to the first superimposed region, in the first data for display, generates a second portion in the first data for display, which corresponds to the first non-superimposed region based on first input image data in the data of the projection target image, which corresponds to the first non-superimposed region, and the second brightness, and generates a third portion in the second data for display, which corresponds to the second superimposed region based on second input image data in the data of the projection target image, which corresponds to the second superimposed region, and the first brightness.

(2) The image processing device according to (1), in which the image generation unit generates a fourth portion in the second data for display, which corresponds to the second non-superimposed region, based on third input image data in the data of the projection target image, which corresponds to the second non-superimposed region, and the first brightness.

(3) The image processing device according to (2), in which the image generation unit generates the second portion by correcting brightness of a pixel, which is less than the second brightness, among pixels of the first input image data to the second brightness, generates the third portion by reducing brightness of each pixel of the second input image data by the first brightness, and generates the fourth portion by correcting brightness of a pixel, which is less than the first brightness, among pixels of the third input image data to the first brightness.

(4) The image processing device according to (2) or (3), in which, in a case in which the first brightness and the second brightness are equal to or less than a threshold value, the image generation unit regards the first input image data as the second portion, the second input image data as the third portion, and the third input image data as the fourth portion.

(5) The image processing device according to any one of (1) to (4), further comprising a projection control unit (projection control unit 43) that performs first projection control of projecting the specific image on the overlapping portion only from the first projection unit and second projection control of projecting the specific image on the overlapping portion only from the second projection unit, and a brightness detection unit (brightness detection unit 44) that detects the first brightness of the overlapping portion in a state in which the first projection control is performed and stores the detected first brightness in a storage medium (storage medium 4a), and detects the second brightness of the overlapping portion in a state in which the second projection control is performed and stores the detected second brightness in the storage medium (storage medium 4a), in which the brightness acquisition unit acquires the first brightness and the second brightness from the storage medium.

(6) The image processing device according to (5), in which the projection control unit performs the first projection control a plurality of times by changing a set value (brightness set value n) of brightness of a first light source (light source 11a) included in the first projection unit, and performs the second projection control a plurality of times by changing a set value (brightness set value n) of brightness of a second light source (light source 11a) included in the second projection unit, the brightness detection unit stores the first brightness detected for each first projection control in association with the set value of the brightness of the first light source in a state in which the first projection control is performed, and stores the second brightness detected for each second projection control in association with the set value of the brightness of the second light source in a state in which the second projection control is performed, and the brightness acquisition unit acquires, from the storage medium, the first brightness and the second brightness which correspond to the set values of the brightness of the first light source and the brightness of the second light source set when the projection target image is displayed.

(7) The image processing device according to any one of (1) to (4), in which the brightness acquisition unit acquires, from the first brightness and the second brightness stored in association with each set value of brightness of a first light source included in the first projection unit and a second light source included in the second projection unit, the first brightness and the second brightness which correspond to the set values of the brightness of the first light source and the brightness of the second light source set when the projection target image is displayed.

(8) A projection system comprising the image processing device according to any one of (1) to (7), the first projection unit, and the second projection unit.

(9) An image processing method in which, for displaying a projection target image by projecting a first image in a first projection range from a first projection unit and projecting a second image in a second projection range that overlaps a part of the first projection range from a second projection unit, first data for display of the first image and second data for display of the second image are generated from data of the projection target image, in which a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, and the image processing method comprises a brightness acquisition step of acquiring first brightness which is brightness of the overlapping portion in a state in which a specific image is projected on the overlapping portion only from the first projection unit and second brightness which is brightness of the overlapping portion in a state in which the specific image is projected on the overlapping portion only from the second projection unit, and an image generation step of generating data for projecting the specific image, as a first portion in the first data for display, which corresponds to the first superimposed region, generating a second portion in the first data for display, which corresponds to the first non-superimposed region based on first input image data in the data of the projection target image, which corresponds to the first non-superimposed region, and the second brightness, and generating a third portion in the second data for display, which corresponds to the second superimposed region based on second input image data in the data of the projection target image, which corresponds to the second superimposed region, and the first brightness.

(10) The image processing method according to (9), in which in the image generation step, a fourth portion in the second data for display, which corresponds to the second non-superimposed region, is further generated based on third input image data in the data of the projection target image, which corresponds to the second non-superimposed region, and the first brightness.

(11) The image processing method according to (10), in which in the image generation step, the second portion is generated by correcting brightness of a pixel, which is less than the second brightness, among pixels of the first input image data to the second brightness, the third portion is generated by reducing brightness of each pixel of the second input image data by the first brightness, and the fourth portion is generated by correcting brightness of a pixel, which is less than the first brightness, among pixels of the third input image data to the first brightness.

(12) The image processing method according to (10) or (11), in which in the image generation step, in a case in which the first brightness and the second brightness are equal to or less than a threshold value, the first input image data is regarded as the second portion, the second input image data is regarded as the third portion, and the third input image data is regarded as the fourth portion.

(13) The image processing method according to any one of (9) to (12), further comprising a projection control step of performing first projection control of projecting the specific image on the overlapping portion only from the first projection unit and second projection control of projecting the specific image on the overlapping portion only from the second projection unit, and a brightness detection step of detecting the first brightness of the overlapping portion in a state in which the first projection control is performed and storing the detected first brightness in a storage medium, and detecting the second brightness of the overlapping portion in a state in which the second projection control is performed and storing the detected second brightness in the storage medium, in which in the brightness acquisition step, the first brightness and the second brightness are acquired from the storage medium.

(14) The image processing method according to (13), in which in the projection control step, the first projection control is performed a plurality of times by changing a set value of brightness of a first light source included in the first projection unit, and the second projection control is performed a plurality of times by changing a set value of brightness of a second light source included in the second projection unit, in the brightness detection step, the first brightness detected for each of the first projection controls is stored in association with the set value of the brightness of the first light source in a state in which the first projection control is performed, and the second brightness detected for each of the second projection controls is stored in association with the set value of the brightness of the second light source in a state in which the second projection control is performed, and in the brightness acquisition step, from the storage medium, the first brightness and the second brightness which correspond to the set values of the brightness of the first light source and the brightness of the second light source set when the projection target image is displayed are acquired.

(15) The image processing method according to any one of (9) to (12), in which in the brightness acquisition step, from the first brightness and the second brightness stored in association with each set value of brightness of a first light source included in the first projection unit and a second light source included in the second projection unit, the first brightness and the second brightness which correspond to the set values of the brightness of the first light source and the brightness of the second light source set when the projection target image is displayed are acquired.

(16) An image processing program causing a computer to perform an image processing method in which, for displaying a projection target image by projecting a first image in a first projection range from a first projection unit and projecting a second image in a second projection range that overlaps a part of the first projection range from a second projection unit, the first image and the second image are generated from the projection target image, in which in the image processing method, a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, and the image processing method comprises a brightness acquisition step of acquiring first brightness which is brightness of the overlapping portion in a state in which a specific image is projected on the overlapping portion only from the first projection unit and second brightness which is brightness of the overlapping portion in a state in which the specific image is projected on the overlapping portion only from the second projection unit, and an image generation step of generating a black image as the first superimposed region, generating the first non-superimposed region based on a first input image of the projection target image, which corresponds to the first non-superimposed region, and the second brightness, and generating the second superimposed region based on a second input image of the projection target image, which corresponds to the second superimposed region, and the first brightness.

Various embodiments have been described above with reference to the drawings, but it is needless to say that the present invention is not limited thereto. It is obvious that those skilled in the art can conceive various changes or modifications within the scope described in the claims, and naturally, such changes or modifications also belong to the technical scope of the present invention. Further, the components in the embodiments described above may be optionally combined without departing from the spirit of the invention.

Note that the present application is based on a Japanese patent application filed on Mar. 27, 2019 (JP2019-061683), the contents of which are incorporated herein by reference.

According to the present invention, in a case in which a part of the plurality of images is overlapped and projected, the gradation of the projection image can be aligned as a whole to improve the image quality, which is effective for displaying the image on a large screen.

EXPLANATION OF REFERENCES

100: projection system
1: first projection device
11: display unit
11a: light source
11b: optical modulation unit
12: projection optical system
13: projection unit
14: control unit
15: black image
2: second projection device
4: control device
4a: storage medium
41: image generation unit
42: brightness acquisition unit
43: projection control unit
44: brightness detection unit
5: imaging unit
6: screen
10: first projection range
10G: first division image
10a: first superimposed region
10b: first non-superimposed region
10A: overlapping portion
10B: non-overlapping portion
20: second projection range
20G: second division image
20a: second superimposed region
20b: second non-superimposed region
20A: overlapping portion
20B: non-overlapping portion

What is claimed is:

1. An image processing device for a projection system that displays a projection target image by projecting a first image in a first projection range from a first projector and projecting a second image in a second projection range, that overlaps a part of the first projection range, from a second projector, wherein a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, the image processing device comprises at least one processor configured to implement:
  generating first data for display of the first image and second data for display of the second image from data of the projection target image, and
  acquiring first brightness which is brightness of the overlapping portion in a state in which a specific image is projected on the overlapping portion only from the first projector and second brightness which is brightness of the overlapping portion in a state in which the specific image is projected on the overlapping portion only from the second projector, and the at least one processor is configured to implement generating the first data for display and the second data for display based on the first brightness and the second brightness.

2. The image processing device according to claim 1, wherein the at least one processor is further configured to implement:

performing first projection control of projecting the specific image on the overlapping portion only from the first projector and second projection control of projecting the specific image on the overlapping portion only from the second projector; and detecting the first brightness of the overlapping portion in a state in which the first projection control is performed and storing the detected first brightness in a storage medium, and detecting the second brightness of the overlapping portion in a state in which the second projection control is performed and storing the detected second brightness in the storage medium, wherein the at least one processor is configured to implement: acquiring the first brightness and the second brightness from the storage medium.

3. The image processing device according to claim 2, wherein the at least one processor is configured to implement: performing the first projection control a plurality of times by changing a set value of brightness of a first light source included in the first projector, and performing the second projection control a plurality of times by changing a set value of brightness of a second light source included in the second projector, the at least one processor is configured to implement: storing the first brightness detected for each of the first projection controls in association with the set value of the brightness of the first light source in a state in which the first projection control is performed, and storing the second brightness detected for each of the second projection controls in association with the set value of the brightness of the second light source in a state in which the second projection control is performed, and the at least one processor is configured to implement: acquiring, from the storage medium, the first brightness and the second brightness which correspond to the set values of the brightness of the first light source and the brightness of the second light source set when the projection target image is displayed.

4. The image processing device according to claim 1, wherein the at least one processor is configured to implement: acquiring, from the first brightness and the second brightness stored in association with each set value of brightness of a first light source included in the first projector and a second light source included in the second projector, the first brightness and the second brightness which correspond to the set values of the brightness of the first light source and the brightness of the second light source set when the projection target image is displayed.

5. A projection system comprising:
the image processing device according to claim 1;
the first projector; and
the second projector.

6. An image processing method in which, for displaying a projection target image by projecting a first image in a first projection range from a first projector and projecting a second image in a second projection range, that overlaps a part of the first projection range, from a second projector, first data for display of the first image and second data for display of the second image are generated from data of the projection target image, wherein a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, and the image processing method comprises
a brightness acquisition step of acquiring first brightness which is brightness of the overlapping portion in a state in which a specific image is projected on the overlapping portion only from the first projector and second brightness which is brightness of the overlapping portion in a state in which the specific image is projected on the overlapping portion only from the second projector, and a step of generating the first data for display and the second data for display based on the first brightness and the second brightness.

7. The image processing method according to claim 6, further comprising:

a projection control step of performing first projection control of projecting the specific image on the overlapping portion only from the first projector and second projection control of projecting the specific image on the overlapping portion only from the second projector; and a brightness detection step of detecting the first brightness of the overlapping portion in a state in which the first projection control is performed and storing the detected first brightness in a storage medium, and detecting the second brightness of the overlapping portion in a state in which the second projection control is performed and storing the detected second brightness in the storage medium, wherein, in the brightness acquisition step, the first brightness and the second brightness are acquired from the storage medium.

8. The image processing method according to claim 7, wherein, in the projection control step, the first projection control is performed a plurality of times by changing a set value of brightness of a first light source included in the first projector, and the second projection control is performed a plurality of times by changing a set value of brightness of a second light source included in the second projector, in the brightness detection step, the first brightness detected for each of the first projection controls is stored in association with the set value of the brightness of the first light source in a state in which the first projection control is performed, and the second brightness detected for each of the second projection controls is stored in association with the set value of the brightness of the second light source in a state in which the second projection control is performed, and in the brightness acquisition step, from the storage medium, the first brightness and the second brightness which correspond to the set values of the brightness of the first light source and the brightness of the second light source set when the projection target image is displayed are acquired.

9. The image processing method according to claim 6, wherein, in the brightness acquisition step, from the first brightness and the second brightness stored in association with each set value of brightness of a first light source included in the first projector and a second light source included in the second projector, the first brightness and the second brightness which correspond to the set values of the brightness of the first light source and the brightness of the second light source set when the projection target image is displayed are acquired.

10. A non-transitory computer readable medium storing an image processing program causing a computer to perform an image processing method in which, for displaying a projection target image by projecting a first image in a first projection range from a first projector and projecting a second image in a second projection range, that overlaps a part of the first projection range, from a second projector, first data for display of the first image and second data for display of the second image are generated from data of the projection target image, wherein, in the image processing method, a region of the first image, which is projected on an overlapping portion of the first projection range and the second projection range, is defined as a first superimposed region and a region of the first image other than the first superimposed region is defined as a first non-superimposed region, a region of the second image, which is projected on the overlapping portion, is defined as a second superimposed region and a region of the second image other than the second superimposed region is defined as a second non-superimposed region, and the image processing method comprises a brightness acquisition step of acquiring first brightness which is brightness of the overlapping portion in a state in which a specific image is projected on the overlapping portion only from the first projector and second brightness which is brightness of the overlapping portion in a state in which the specific image is projected on the overlapping portion only from the second projector, and a step of generating the first data for display and the second data for display based on the first brightness and the second brightness.

* * * * *